United States Patent [19]
Murakami et al.

[11] Patent Number: 5,194,878
[45] Date of Patent: Mar. 16, 1993

[54] COLOR ELECTROPHOTOGRAPHIC METHOD

[75] Inventors: Hajime Murakami, Kusatsu; Yoshimasa Kumashiro, Moriyama, both of Japan

[73] Assignee: Ishihara Sangyo Kaisha Ltd., Osaka, Japan

[21] Appl. No.: 752,213

[22] Filed: Aug. 21, 1991

Related U.S. Application Data

[63] Continuation of Ser. No. 440,384, Nov. 22, 1989, abandoned.

[30] Foreign Application Priority Data

Nov. 25, 1988 [JP] Japan ................................ 63-297950

[51] Int. Cl.⁵ .............................................. H04N 1/21
[52] U.S. Cl. ...................................... 346/108; 358/296
[58] Field of Search .................... 346/108, 1.1, 107 R, 346/160; 358/75, 80, 300, 302, 296, 298

[56] References Cited

U.S. PATENT DOCUMENTS

| | | | |
|---|---|---|---|
| 4,518,246 | 5/1985 | Spitzner et al. | 355/239 |
| 4,573,788 | 4/1986 | Nagashima et al. | 355/14 |
| 4,583,839 | 4/1986 | Suzuki | 355/14 |
| 4,680,625 | 7/1987 | Shoji et al. | 358/80 |
| 4,690,541 | 9/1987 | Sakai et al. | 355/4 |
| 4,780,744 | 10/1988 | Porter et al. | 355/216 |
| 4,814,797 | 3/1989 | Haneda et al. | 346/160 |

FOREIGN PATENT DOCUMENTS

| | | |
|---|---|---|
| 0103843 | 3/1984 | European Pat. Off. . |
| 61-53874 | 3/1986 | Japan . |
| 2030519 | 4/1980 | United Kingdom . |

*Primary Examiner*—Mark J. Reinhart
*Attorney, Agent, or Firm*—Cushman, Darby & Cushman

[57] ABSTRACT

Disclosed is a color electrophotographic method according to which color images of high quality can be stably obtained by digital signal processing of image information. This method comprises converting a read image signal to a digital signal, subjecting the digital signal to signal processing which includes tone correction of photoreceptor and tone correction of toner color density, exposing charged photoreceptor with a light having intensity modulated according to the signal to form a electrostatic latent image and then developing the latent image.

9 Claims, 10 Drawing Sheets

SPECTRAL CHARACTERISTICS OF TONER

ABSORBANCE OF EACH TONER AT 780nm

DENSITY SIGNAL

DEVELOPING POTENTIAL
DIFFERENCE (DATA)

LOOK − UP TABLE

CHANGE OF E-V CURVE DUE
TO CHARGE VOLTAGE

LOOK-UP TABLE

CHANGE OF E-V CURVE DUE TO TEMPERATURE, HUMIDITY

LOOK-UP TABLE

COLOR ELECTROPHOTOGRAPHIC METHOD

This is a continuation of application Ser. No. 07/440,384, filed on Nov. 22, 1989, which was abandoned upon the filing hereof Aug. 21, 1991.

BACKGROUND OF THE INVENTION

The present invention relates to a color electrophotographic method and a method for stably forming color images of high quality by digital signal processing of image information.

As a method for color image formation by electrophotographic process, CPC electrophotographic method according to so-called analogue processing has been known which comprises repeating necessary times the steps of irradiating an original image with light, exposing a charged photoreceptor through a color separation filter to the light reflected from or transmitted through the original image, thereby to form an electrostatic latent image on the photoreceptor, then developing the latent image with color toner, whereby toner image is directly formed on the photoreceptor. This CPC process is said to be able to easily produce images superior in resolving power to so-called PPC process which comprises transferring toner images.

The inventors have paid their attention to the fact that titanium dioxide is good in so-called halftone image reproducibility and excellent in whiteness and hiding power as photoconductive material of photoreceptor in the electrophotographic method according to the above-mentioned CPC process and have conducted research in an attempt to produce so-called pictorial color images excellent in halftone reproducibility, graininess and resolving power comparable to those of silver halide photographic print by electrophotographic method, namely, by forming electrostatic latent image using the titanium dioxide photoreceptor and then developing this latent image with a liquid developer prepared by dispersing toner particles in an electrically insulating liquid which gives image of superior graininess. As a result, it has been recognized that quality of the resulting color image is considerably improved, but there are still many problems to be solved.

That is, (1) in case of the analogue process, as is clear from the gradation characteristic of this process as shown in FIG. 2, original image density vs output image density characteristics becomes nonlinear to bring about distortion in color reproduction. In this respect, further explanation will be made based on the tone reproduction characteristic curves in analogue process as shown in FIG. 2 (liquid developing was carried out with a liquid developer using a photosensitive paper applied with titanium dioxide as a photoconductor). The first quadrant shows relation between original image density and output image density. The second quadrant shows relation between surface potential of photoreceptor in development and output image density, that is indicates characteristics of toner used in development. The third quadrant shows relation between exposure and surface potential of photoreceptor, that is indicates light decay characteristics of photoreceptor. The fourth quadrant shows relation between original image density and exposure and this relation is linear in analogue process, because that exposure is fundamentally carried out with light quantity in proportion to reflectance or transmittance of original image. Since characteristics of photoreceptor in the third quadrant and characteristics of toner in the second quadrant are both nonlinear and besides are not in the relation to compensate the mutual nonlinearity, the relation between the original image density and output image density is not linear, but shows distortion. Distortion is great especially in higher density area and image of higher density area tends to be indistinguishable. That is, when a color image is obtained by superposing three color separation images of yellow, magenta and cyan, even in the case of titanium dioxide photosensitive paper which is wide in tone reproduction region, reproduction is as shown in FIG. 2 and there is a limit in reproduction of original. In case of analogue system, even if exposure is changed so as to correct distortion of color reproduction caused by nonlinear effect, only the quantity of light changes depending on distortion of decay characteristics. Therefore, even if, for example, "red" of middle color density is made pale in order to make it to favorite tone with keeping expression of pale and deep portions of "red" as they are, since the operation is only the prolongation of exposing time, the pale "red" becomes paler and the deep "red" also becomes pale, resulting in loss of balance as a whole. Thus, in analogue system, it has been substantially impossible to correct only the desired color without losing balance with others.

(2) Furthermore, photoreceptor is susceptible to influence by variation of environmental conditions such as temperature and humidity and due to the variation, charging characteristics and photosensitivity characteristics are greatly changed and stability of image is apt to be damaged. Therefore, proposal to provide severe control mechanism of environmental condition or to use various moistureproofness imparting agents have been made, but the above-mentioned influences have not yet been fully avoided. Furthermore, in color electrophotographic method according to so-called CPC process by which toner images are superposed on photoreceptor, with reference to the second and the following colors, exposure is carried out with light which transmits the layer of the toner image which has been developed on a photoreceptor at the previous image forming step and hence, there occurs difference in quantity of light which reaches the photoreceptor due to so-called light screening effect owing to toners between the portions of photoreceptor where the toner image is present and no toner image is present. That is, quantity of light which reaches the portion of photoreceptor where toner image is present is smaller and correspondingly light decay of surface potential is smaller and as a result excessive amount of toner sticks to the photoreceptor to cause turbidity of color. For example, in case cyan is developed as the first color and yellow and magenta are developed as the second and the third colors, since cyan has unwanted absorption in 400–600 nm as shown in FIG. 3, when blue light exposure necessary for development of yellow is crried out over cyan iamge, surface potential is higher about 30V in the portion where cyan image is present than in the portion where no cyan image is present and correspondingly yellow is much developed. This is the same in case of green light exposure for development of magenta. In analogue system according to which photoreceptor is subjected to exposure directly to respective color separation lights, it is impossible to avoid influence of toner image developed on the photoreceptor at the previous image forming step. Therefore, there has been employed such image forming method as superposing the toners in the order of causing less light screening effect of toner. This method is still not satisfactory in color clarity of image.

As opposed to the analogue process, so-called digital image recording process has been known which includes converting an original image to electric signal by photoelectric conversion means, further converting the electric signal to digital signal, subjecting the digital signal to various digital signal processing and carrying out exposure by the means to convert electric signal to light such as laser beam. It is said that according to this digital process, since information of original is obtained as digital electric signal, color correction which cannot be performed by the analogue process can be easily made at the stage of electric signal, and consequently color reproduction can be improved. However, cadmium sulfide, selenium, amorphous silicon, zinc oxide and organic photoconductors which are widely used as electrophotographic photoreceptors give hard tone and are liable to produce binary image of ON and OFF. Therefore, in case of reproduction of halftone using these photoconductors, for this purpose, it is necessary to carry out an image processing by making, for example, a special image processing for halftone reproduction, for example, by dither method. According to the dither method, one matrix comprises a plurality of picture elements adjacent to each other at their length and breadth and threshold values corresponding to respective picture elements are made different in the matirx to carry out conversion to binary image and output as ON, OFF dots. Therefore, in laser exposure method based on the dither method, influence of variation of environmental conditions such as temeprature and humidity on the formation of image is relatively small and besides, since the tone expression is by area modulation system and size of the matrix is much larger than the picture elements, some improvement of tone expression can be seen in the dither method, but considerable reduction of resolving power and graininess than according to analogue process is unavoidable.

Furthermore, for the exposure by laser beam it is desired to use semiconductor laser beam which is easy in control of operation and besides, its emission wavelength is mainly composed of from about 830 nm to 780 nm. However, as is clear from spectral characteristcs of FIG. 3, coloring materials used for toner of developer are not complete in transmission of light of around 780 nm and as shown in FIG. 4, absorption of, for example, about 40% is unavoidable when deposition amount of cyan toner increases. Thus, in the color electrophotographic method according to CPC process of superposing respective color toners, color turbidity is brought about and this effect cannot be ignored.

SUMMARY OF THE INVENTION

In an attempt to solve the above-mentioned problems in the color electrophotographic method according to CPC process of liquid developing type, the inventors have tried to produce images excellent in continuous tone using exposing system which carries out writing by continuously changing the laser beam intensity for every dot of laser beam in place of the system by which the special image processing for halftone reproduction is carried out in the matrix with keeping the laser beam intensity at constant and they have made further research. As a result, they have accomplished the present invention based on the following findings: In order to produce pictorial images by outputting in good gradation the image over the wide range from low density portion to high density portion, it is very important to carry out in high stability the severe control of conditions for formation of image in halftone area. That is, in order to make tone reproduction from original to have linear characteristics over a wide range of density, it is necessary (1) that exposure intensity for respective original image densities by laser beam is subjected to signal processing so as to carry out such tone correction as to compensate independently (a) the relationship between exposure intensity and decay characteristics of charging surface potential at exposing and (b) the relation between surface potential (latent image potential) of photoreceptor at development and deposition amount of toner, and intensity modulation of laser beam is effected based on the results of signal processing and exposure is conducted and (2) that in this case the above tone correction is carried out so as to compensate the influence of variation of environmental conditions such as temperature and humidity on charging characteristics and photosensitivity of photoreceptor and furthermore (3) that in this case intensity modulation of laser beam is conducted by signal processing so as to compensate absorption of the exposing laser beam by the developed toner layer of the previous stage as mentioned above and more desirably masking is carried out in combination.

The present invention relates to a color electrophotographic method, characterized by converting the read image signal to digital signal, subjecting the signal to signal processing including tone correction of photoreceptor and tone correction of toner color density, exposing a charged photoreceptor to a light intensity which is modulated depending on the signal to form an electrostatic latent iamge and then developing the latent image. Furthermore, the present invention relates to a color electrophotographic method, characterized in that the above-mentioned signal processing for tone correction includes (1) compensation of environmental conditions of temperature and humidity, (2) control of charging potential at constant, and (3) adjustment of color density of output image and compensation of absorption of the light of exposing by the toner image formed at the previous stage is further added.

DESCRIPTION OF THE INVENTION

Figure 13:
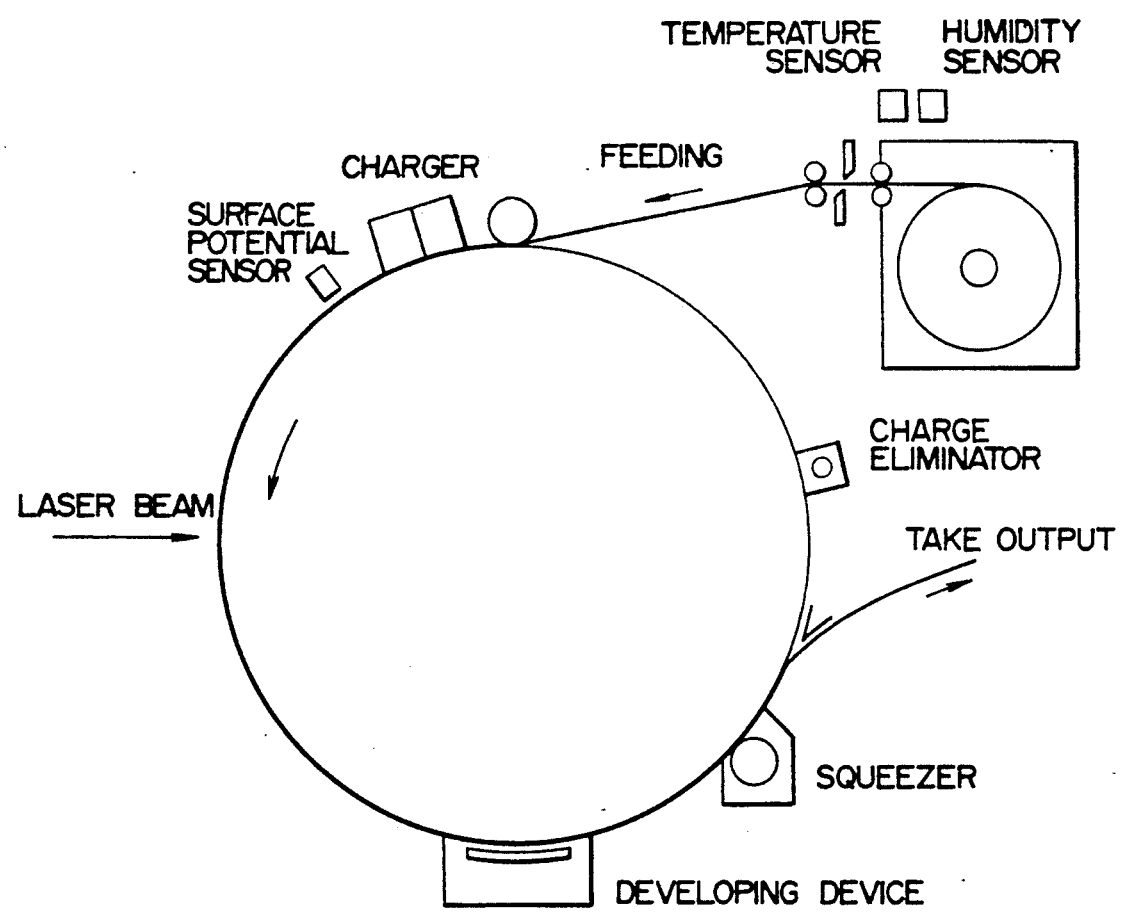
FIG. 13 shows construction of image outputting part of the apparatus in Example of the present invention.
Figure 14:
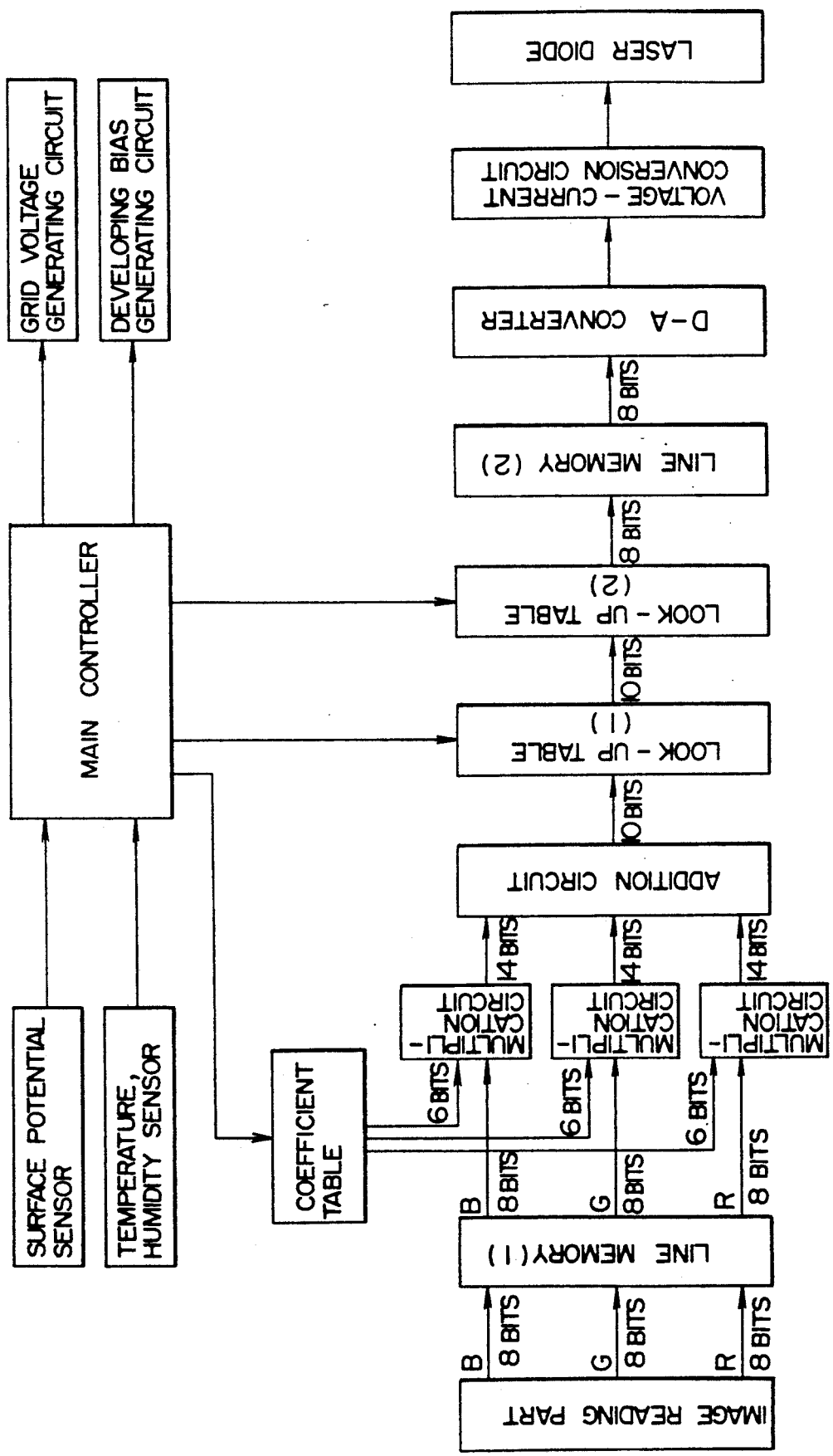
FIG. 14 is a block diagram which shows outline of color image processing.

As is clear from FIGS. 13 and 14, construction of apparatus for practicing the electrophotographic method of the present invention comprises, provided in a CPC electrophotographic copying machine of wet developing type, (1) a means of reading color separation images of an original image, (2) a means of converting the read analogue image information to digital signal, and (3) a means of signal processing for control of the digital image ignal to optimized image forming conditions such as the above-mentioned tone correction, namely, a means of measuring surface potential of photoreceptor just after charging and memorizing it, a means of automatically correcting preset conditions so that the surface potential of the photoreceptor at the next or the following steps becomes standard by comparing with standard potential, a means of measuring surface potential just after charging and automatically setting correct exposing conditions for this surface potential, a means of measuring temperature and humdiity of environment, a means of reading exposure conditions optimum for the measured values among environmental correction data and carrying out automatic correction, and the like.

Photoreceptor used in the color electrophotographic method of the present invention comprises an electrically conductive substrate and, laminating thereon, a photosensitive layer mainly composed of a dispersion of fine powders of a photoconductive material in an electrically insulating binder resin. As the conductive substrate, mention may be made of, for example, a metallic plate, and a paper and a plastic film which are made electrically conductive by coating, impregnating or filling a conductivity imparting agent thereon or therein or by vapor deposition of a metal such as aluminium. Use of titanium dioxide as the photoconductive material is most preferred in the present invention. Such titanium dioxide includes, for example, (1) titanium dioxide doped with Zn, Li, Mg, Ca, Br or Ba as disclosed in Japanese Patent Kokoku (Post Exam Publn) No. 40177/83, (2) the metal-doped titanium dioxide of (1) treated with a mineral acid as disclosed in Japanese Patent Kokoku (Post Exam Publn) No. 40178/83, (3) titanium dioxide to which is added a nitrogen-containing cyclic compound such as phenidone as disclosed in Japanese Patent Kokoku (Post Exam Publn) No. 19330/84, and (4) titanium dioxide applied with photosensitivity to semiconductor laser beam of near infrared region of around 750–850 nm by sensitization treatment with cyanine dyes as disclosed in Japanee Patent Kokoku (Post Exam Publn) No. 18743/88.

Developer used in the present invention is preferably a liquid developer prepared by adding a coloring material and a resin to an electrically insulating liquid and dispersing them therein and various kinds of such liquid developers can be used. In this case, it is preferred to use a charge control agent disclosed, for example, in Japanese Patent Kokoku (Post Exam Publn) No. 9416/83.

In the following examples, photoreceptors prepared by the above-mentioned methods with titanium dioxide photocondcutive material and liquid developers were used.

The present invention will be further explained with reference to one example.

EXAMPLE

Figure 1:
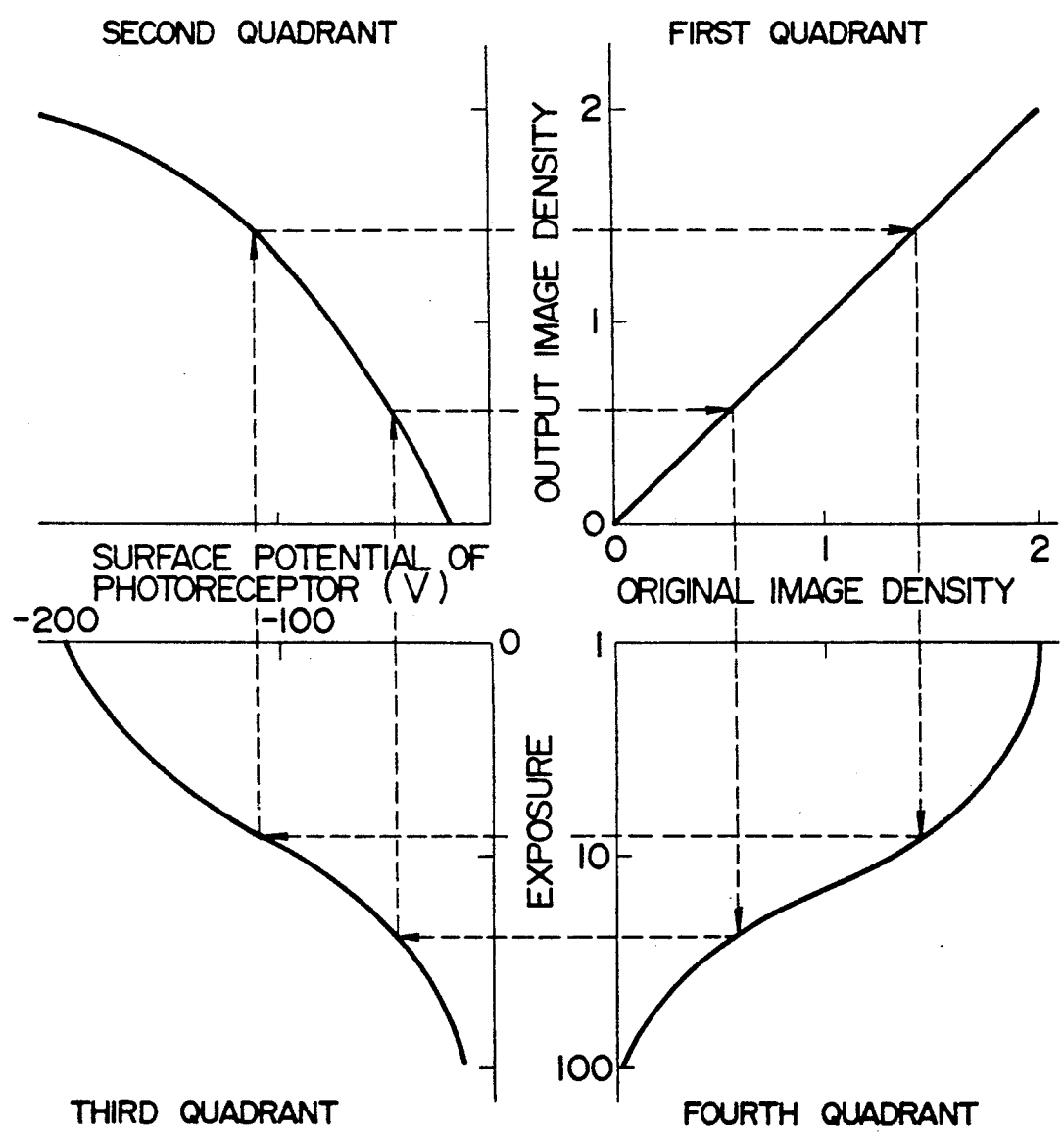
FIG. 1 is a graph which shows relations between tone reproduction and respective parameters according to the method of the present invention.
Figure 2:
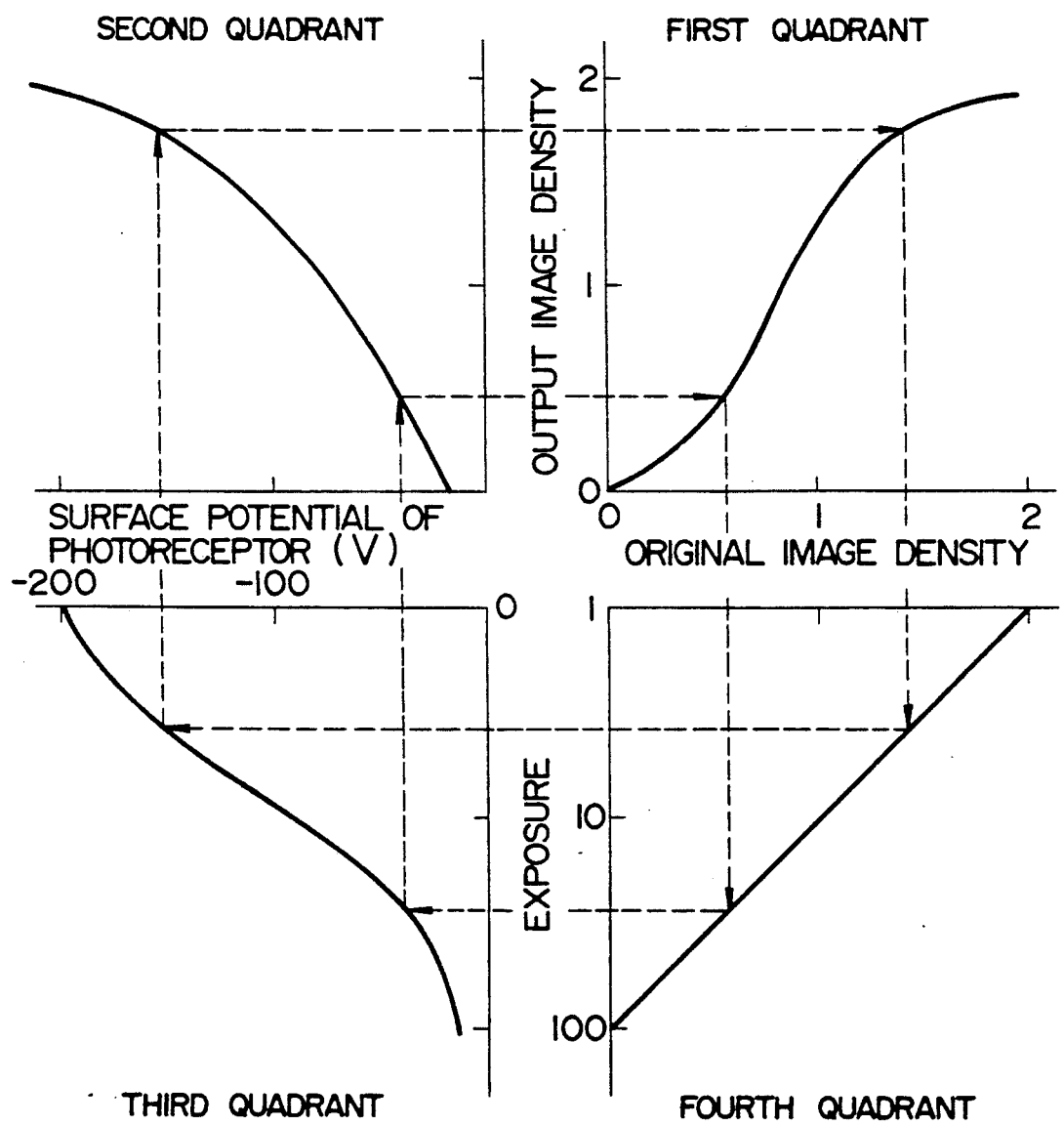
FIG. 2 is a graph which shows relations between tone reproduction and respective parameters according to analogue process.
Figure 5:
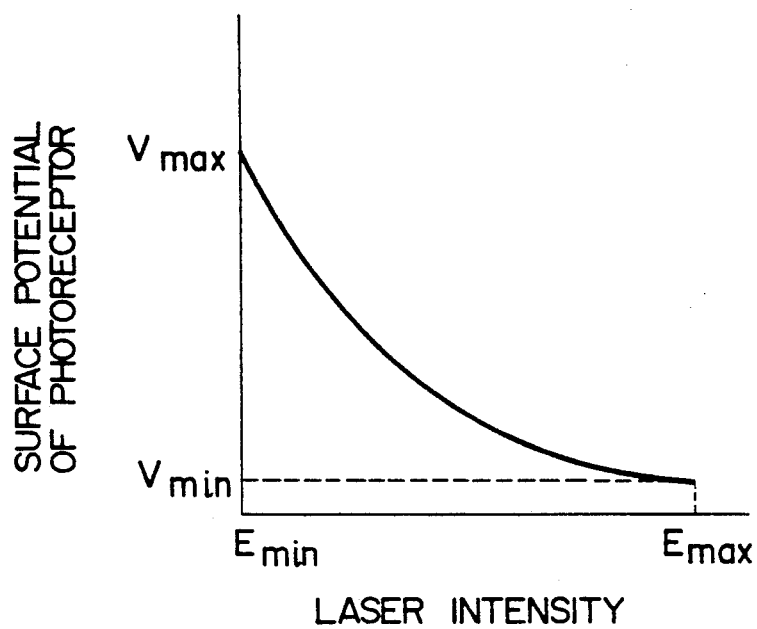
FIG. 5 is a graph which shows E-V characteristics.

First, explanation will be made on controlling method for obtaining the continuous tone reproduction characteristics shown in FIG. 1 according to the present invention. FIG. 5 shows relation between intensity of laser beam and surface potential of photoreceptor after exposure when surface of photoreceptor which has been uniformly charged is exposed with laser beam (this curve is referred to as "E-V curve"). This corresponds to the third quadrant in FIG. 1. Since the photoreceptor is subjected, for example, to negative charging, the ordinate axis shows negative potential. With increase of laser exposure intensity, the surface potential of the photoreceptor decays and the potential decays to $V_{min}$ at maximum exposure intensity $E_{max}$.

Figure 6:
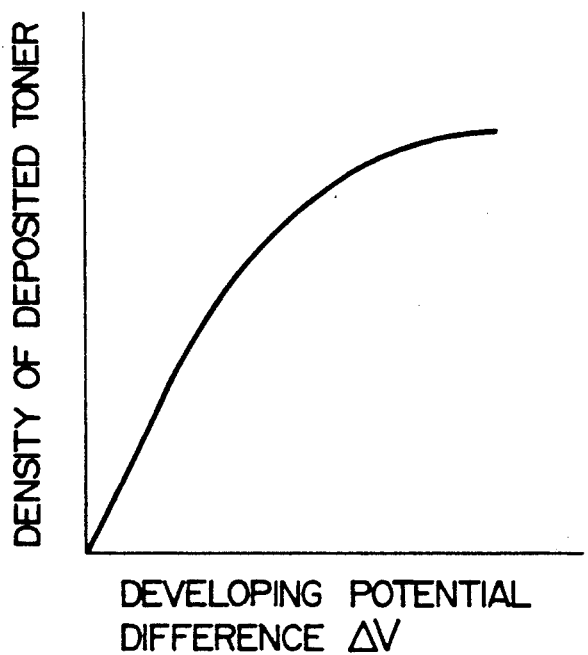
FIG. 6 is a graph which shows V-D characteristics.

When the toner particles in liquid developer are, for example, positively charged, the toner particles migrate towards photoreceptor by electrostatic attraction at developing step and a larger amount of the toner particles are deposited on the portion having higher surface potential of the photoreceptor. Since potential remains also on the surface of the maximum exposure portion of photoreceptor, if development is conducted as it is, toner particles are also deposited on this maximum exposure portion, resulting in so-called fogging which means coloration of the whole surface of photoreceptor. In order to prevent this phenomenon, electrostatic attraction in the maximum exposure portion is extinguished using so-called developing bias which is attained by placing an electrode opposite to photoreceptor in the developer and applying thereto a voltage homopolar to the surface potential of photoreceptor in developing step. For this developing bias, a voltage similar to minimum surface potential $V_{min}$ is applied. FIG. 6 shows relation between difference between photoreceptor surface potential and this developing bias after exposure, namely, developing potential difference and density of deposited toner after development. (This curve is referred to as "V-D curve".) This corresponds to the second quadrant in FIG. 1. This V-D curve varies depending on kind of toner (yellow, magenta, cyan, black).

Tone characteristics of toner and photoreceptor are both nonlinear and for correction thereof a look-up table is used for digital image processing. For image density signal after subjected to color correction, firstly developing potential difference is obtained by look-up table for tone correction of toner and then laser intensity at exposure is obtained by look-up table for tone correction of photoreceptor.

Figure 7:
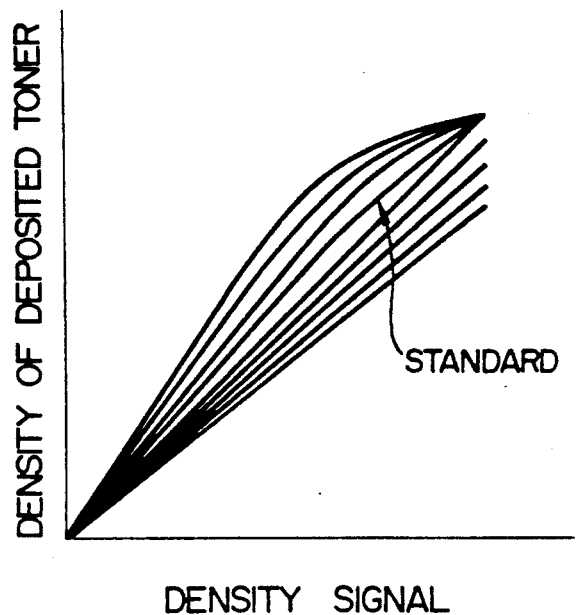
FIG. 7 is a graph which shows relation between density signal and density of deposited toner.
Figure 8:
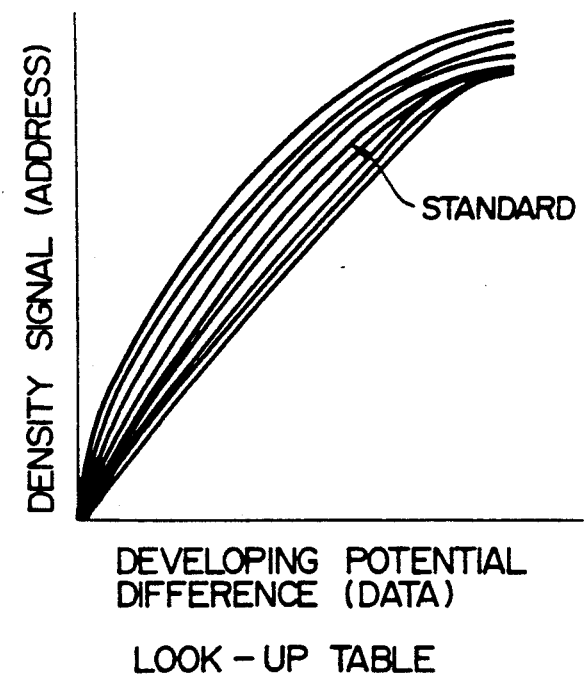
FIG. 8 is a look-up table corresponding to respective densities of deposited toners in FIG. 7.

In tone correction of toner, image density signal is made corresponding to density of deposited toner. For this purpose, look-up table is prepared using density signal as address and the coresponding developing potential difference as data in accordance with the V-D curve of FIG. 6. By using this table, density reproduction highly fidelity to the original density can be attained as in the first quadrant in FIG. 1. Furthermore, when density and color tone are intentionally differentiate from those of original image, namely, adjsutment of density or color balance is carried out, this is possible by changing this look-up table. FIG. 7 is one example where corresponding relation between image density signal and density of deposited toner is shown for respective stages of density adjustment. In the standard case, the density signal corresponds to the density of deposited toner. How the toner deposition density should be varied at respective stages of density adjustment depends on toners of respective colors. Look-up table at respective stages of density adjustment is prepared by obtaining toner deposition density for density signal in accordance with FIG. 7, obtaining developing potential difference corresponding to the toner deposition density from V-D curve of FIG. 6 and writing this developing potential difference as data using the density signal as address. FIG. 8 illustrates the thus prepared look-up table at respective stages. In this FIG. 8, curves of right side are higher in output density.

Figure 9:
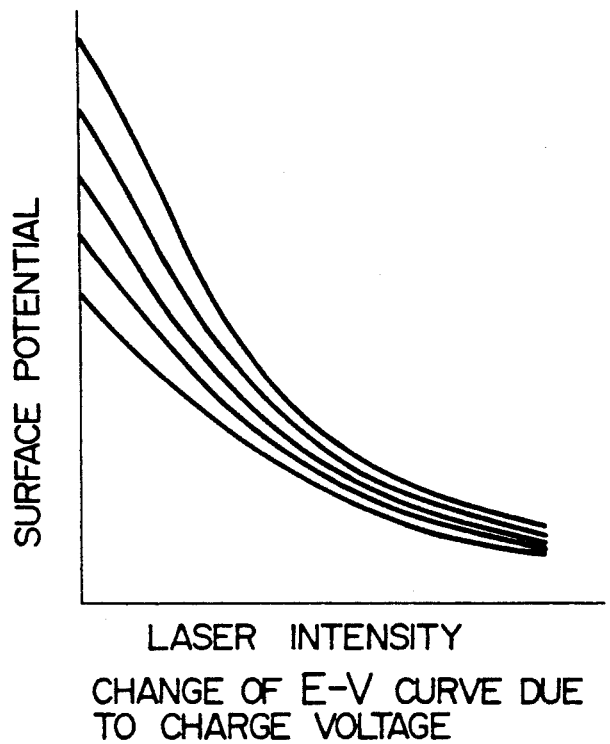
FIG. 9 is a graph which shows E-V characteristics relative to different charge voltage.
Figure 10:
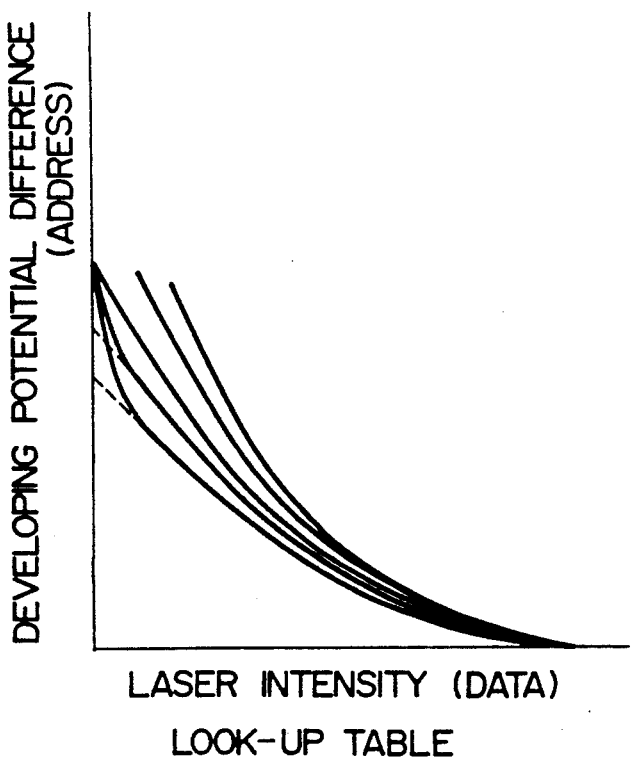
FIG. 10 is a look-up table corresponding to respective charge voltages in FIG. 9.
Figure 11:
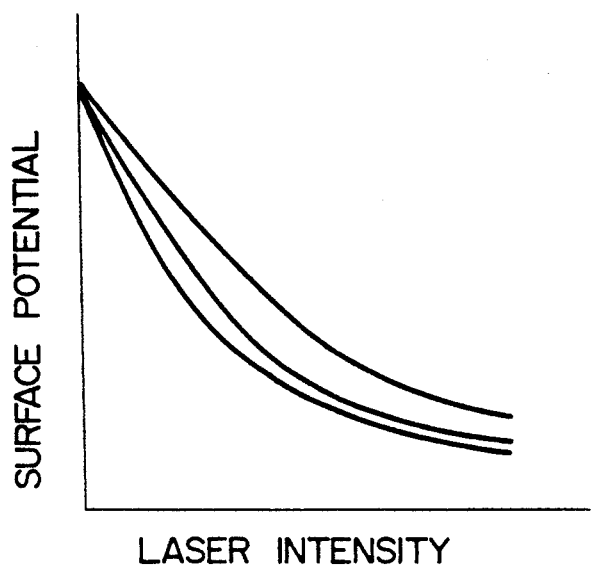
FIG. 11 is a graph which shows E-V characteristics when temperature and humidity are different.
Figure 12:
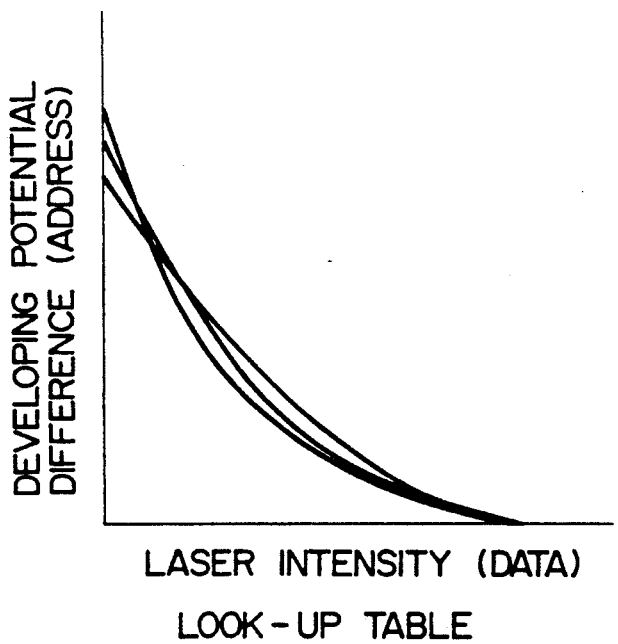
FIG. 12 is a look-up table for carrying out correction in case of FIG. 11.

E-V curve of photoreceptor shown in FIG. 5 differs depending on charge voltage applied to the photoreceptor and further depending on temperature and humidity of environment. Therefore, these conditions are divided into several stages and different corrections are given on respective cases. On the assumption that minimum value $V_{min}$ of surface potential of photoreceptor obtained when exposure intensity is maximum equals to developing bias potential in the E-V curve, developing potential difference is obtained by subtracting this minimum value from surface potential of photoreceptor at respective exposure intensities and laser exposure intensity is written as data using this developing potential difference as address to obtain look-up table. FIG. 9 shows an example of E-V curve for different charge voltage. About −200 V of charge voltage is optimum and when charge voltage deviates from this value, respectively different corrections are conducted at an interval of within 10 V for both the upper and lower sides. FIG. 10 illustrates look-up table corresponding to respective charge voltages in FIG. 9. When charge voltage is extremely low, necessary developing potential difference cannot be obtained in high density portion and so for the portion of large developing potential difference, data corrected by condensing the density is written in the table. FIG. 11 shows an example of E-V curve of photoreceptor when temperature and humidity of environment differ for the same charge voltage. Look-up table for correction in these cases is shown in FIG. 12. In tone correction for photoreceptor, charge voltage of photoreceptor is divided into several stages and besides difference of conditions of temperature and humidity of environment is divided into several stages and different look-up table is used for every combination of them.

Next, method for outputting color image by electrophotographic methd will be explained. On a photoreceptor, first a yellow image is output, then a magenta image is superposed thereon and furthermore a cyan image is superposed thereon, thereby to form a color image. FIG. 13 shows outline of construction of image outputting device. A roll-photoreceptor is contained in a light blocking case. This is cut to suitable size depending on image size and fed and stuck to a cylindrical metal drum by hold-down roll and rotated together with the drum at a constant rate.

The photoreceptor is first charged by a charger. So-called scorotron system is used for charging. Corona discharge is allowed to take place by applying a constant voltage (corona voltage) in the range of, for example, −5 KV to −6 KV to a corona wire and a negative voltage (grid voltage) lower than the corona voltage is applied to several grid wires stretched between the corona wire and the photoreceptor. Thereby the surface of photoreceptor is charged in negative voltage and this charge voltage can be controlled by intensity of the grid voltage. Considering tone characteristics of photoreceptor and toner, there is an optimum value of charge voltage applied to photoreceptor and the charge voltage is controlled so that it is as close as possible to the optimum value employed as a standard value.

Even if charging is carried out with keeping corona voltage and grid voltage of charger at constant, charge voltage applied to photoreceptor is influenced by temperature and humidity of environment. Furthermore, when images are superposed in the order of the first color (yellow), the second color (magenta) and the third color (cyan), easiness of charging differs in respective colors. Therefore, temperature and humidity of environment are divided into several stages and suitable voltages for the first, second and third colors in respective cases are obtained and these are memorized in memory as table values.

Temperature sensor and humidity sensor are provided in the vicinity of the case containing the photoreceptor and values of respective sensors are measured before charging and memorized in memory. When a first charging is carried out, a table value of grid voltage of the first color is selected depending on temeprature and humidity of environment and grid voltage is applied according to this table value. For the second and the following colors or the second and the following sheets, if temperature and humidity of environment greatly differ from the memorized values of the previous step, other table values are selected for grid values depending on the difference and voltage is applied to the grid. If temperature and humidity of environment are nearly the same as those in the previous step, in order to improve accuracy of control, the previous charge voltage measured by surface potential sensor is compared with the standard value and if there is a difference, a voltage subjected to fine adjustment to table value of grid voltage so as to decrease the difference is applied to grid. FIG. 14 is a block diagram which shows flow of image signal. Instead of providing a memory which memorizes all of the data read in the image reading part, reading of iamge and outputting of image are synchronously conducted using line memories which memorize data for several lines. For this purpose, in outputting of respective color toner images, density signals of the three colors blue (B), green (G) and red (R) are read in every outputting.

In image inputting part, reflected light or transmitted light from original image is converted to electric signal while dividing the original image into picture elements, for example, using an optoelectric transducer such as solid-state image sensing device and the electric signal is converted to digital signal corresponding to the density of original image. For color image, color separation signal is obtained, for example, by providing blue, green and red filters before light receptor part of solid-state image sensing device. Furthermore, in the image reading part, shading correction is conducted to correct uneven distribution of quantity of illumination light for original image or variation of characteristics in the image sensing device. Thereafter, image signals of B, G, and R are respectively stored in line memory (1). This line memory (1) has a memory capacity of several lines and since image reading part and the subsequent image processing part are processed in accordance with respectively different clock signals, the line memory (1) is used for adjustment of synchronization between these parts.

Figure 3:
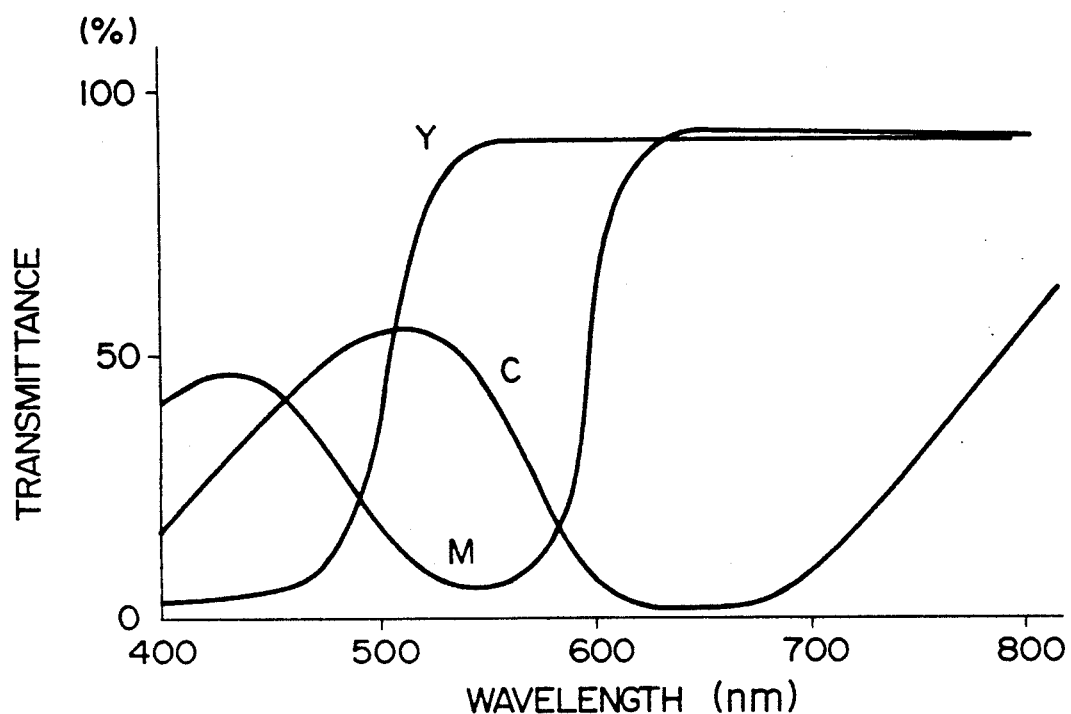
FIG. 3 is a graph which shows spectral characteristics of toner.
Figure 4:
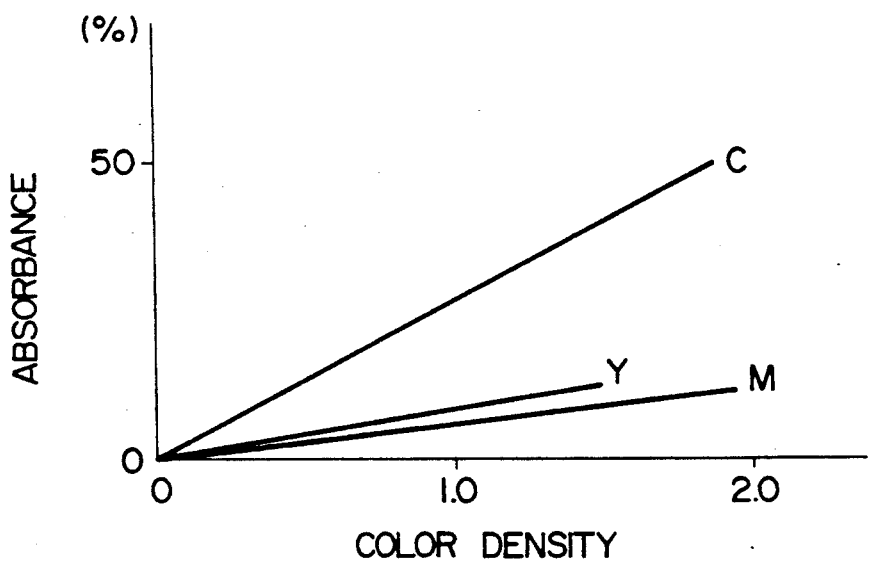
FIG. 4 is a graph which shows absorption of light of around 780 nm by toners of respective colors.

Image signals of B, G, and R are read for respective picture elements from line memory (1) and firstly, color correction for unwanted absorption color of toner and absorption correction of exposed light by toner image developed on the photoreceptor are conducted. As can be seen from FIG. 3, spectral characteristics of toners of three colors are not necessarily ideal three primary color characteristics and there exist unwanted absorption components especially in magenta and cyan. When color image is produced using such coloring materials, turbidity of color caused by unwanted absorption of coloring materials is corrected. For this purpose, masking method is usually employed in the field of color printing. When density signal of B, G, and R for a certain picture element are $D_B$, $D_G$ and $D_R$, respectively and density signals of yellow, magenta and cyan are referred to as $D_Y$, $D_M$ and $D_C$, respectively, these are obtained by the following conversion in linear masking method.

$$D_Y = a_{11}D_B + a_{12}D_G + a_{13}D_R \quad (1)$$

$$D_M = a_{21}D_B + a_{22}D_G + a_{23}D_R \quad (2)$$

$$D_C = a_{31}D_B + a_{32}D_G + a_{33}D_R \quad (3)$$

The nine coefficients of from $a_{11}$ to $a_{33}$ are determined so as to correct turbidity of color mentioned above.

Here, correction is made so as to correct absorption of laser beam by the developed toner layer. When laser exposure is conducted for formation of magenta image on a photoreceptor which has been developed with yellow toner, it is necessary to increase quantity of laser beam for compensation of absorption by the yellow toner layer. Since the smaller the density signal is, the larger the intensity of laser beam is, absorption of laser beam can be substantially corrected by decreasing magenta density signal $D_M$ in the above formula (2) according to the yellow density signal $D_Y$. When magenta density signal after the correction is referred to as $D'_M$, $D'_M$ is as shown in the following formula.

$$\begin{aligned} D_M' &= D_M - \alpha_Y D_Y \\ &= a_{21}'D_B + a_{22}'D_G + a_{23}'D_R \end{aligned} \quad (2)'$$

where $$a_{21}' = a_{21} - \alpha_Y a_{11}$$

$$a_{22}' = a_{22} - \alpha_Y a_{12}$$

$$a_{23}' = a_{23} - \alpha_Y a_{13}$$

wherein coefficient $\alpha_Y (0 \leq \alpha_Y < 1)$ is a constant of proportionality corresponding to absorbance of yellow toner for the wavelength of laser beam. Similarly, in case of formation of cyan image, when cyan density signal after correction of absorption of laser beam by the yellow toner layer and the magneta toner layer present on the photoreceptor is referred to as $D_C'$, this is shown by the following formual.

$$D_C' = a_{31}'D_B + a_{32}'D_G + a_{33}'D_R \quad (3)$$

where $$a_{31}' = a_{31} - (\alpha_Y a_{11} + \alpha_M a_{21} + \alpha_Y \alpha_M a_{11})$$

$$a_{32}' = a_{32} - (\alpha_Y a_{12} + \alpha_M a_{22} + \alpha_Y \alpha_M a_{12})$$

$$a_{33}' = a_{33} - (\alpha_Y a_{13} + \alpha_M a_{23} + \alpha_Y \alpha_M a_{13})$$

wherein $\alpha_M (0 \leq \alpha_M \leq 1)$ is a constant of proportionality corresponding to absorbance of magenta toner for the wavelength of laser beam.

That is, when coefficients of the formulas (1), (2) and (3) of the masking treatment are determined, correction for absorption of laser beam by toner layer(s) is also taken into consideration. The thus corrected nine coefficient values are then memorized in the coefficient table as $a_{11}$, $a_{12}$, $a_{13}$, $a_{21}$, $a_{22}$, $a_{23}$, $a_{31}$, $a_{32}$, and $a_{33}$. From these nine coefficient values, the coefficients $a_{11}$, $a_{12}$ and $a_{13}$ are selected in outputting of yellow image, the coefficients $a_{21}$, $a_{22}$ and $a_{23}$ are selected for outputting of magenta image and the coefficients $a_{31}$, $a_{32}$ and $a_{33}$ are selected in outputting of cyan iamge by instruction of controller. The selected three coefficients are multiplied by density signals of B, G and R in multiplication circuits, respectively and the results are added in addition circuits.

After the color correction, tone correction is made by two look-up tables. First, tone correction is made for toner by look-up table (1). For the look-up table (1) several kinds of tables are prepared and among them, tables corresponding to setting of color, density and color balance of output toner are selected by instruction of main controller (CPU) and used. Then, this output is input in look-up table (2) and tone correction for photoreceptor is conducted. Many tables are also prepared for look-up table (2) and among them an optimum table is selected by instruction of the controller according to surface potential of charged photoreceptor measured by surface potential sensor and temperature and humidity of environment measured by temeprature and humidity sensors and is used. Input and output of look-up table (1) comprise, for example, signals of 10 bits and output of look-up table (2) comprises, for example, signals of 8 bits. Thus, resolving power in the middle ways is made higher for the final output. This is because non-linear conversion is carried out according to these look-up tables and so, if output and input are processed with signals of the same bit number, substantial resolving power of output is lowered than that of input. Output of look-up table (2) is stored in line memory (2). In the image processing part and laser outputting part, processing is carried out according to different clock signals and for adjsutment of synchronism, the line memory (2) is used.

Figure 15:
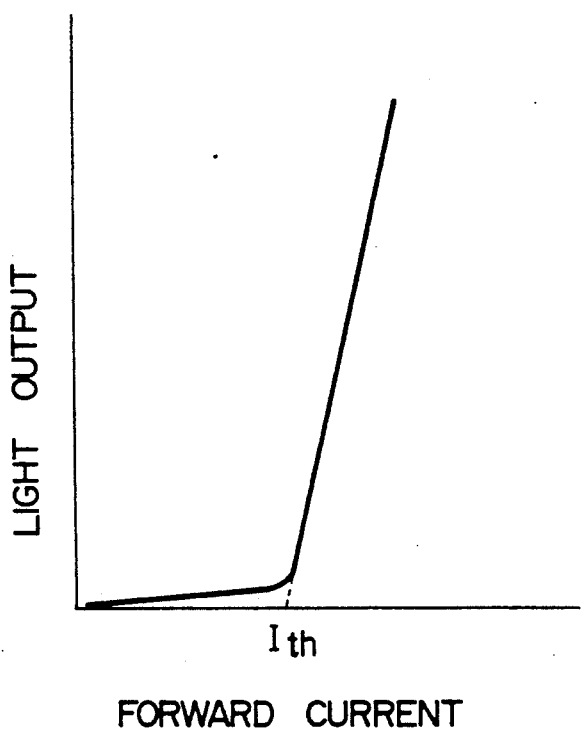
FIG. 15 is a graph which shows relation between forward current and light output in laser diode.

In laser outputting part, image signal is read from line memory (2) synchronously with scanning of laser beam and the image signal is converted to analogue signal by D-A converter. FIG. 15 shows relation between forward current and light output in laser diode. When forward current exceeds threshold value, laser output is greatly modulated according to forward current. Therefore, intensity of laser beam is modulated by modulating forward current in accordance with image signal in the region where the forward current is greater than this threshold current ($I_{th}$). The output of D-A converter is input in voltage-current conversion circuit, where image signal is converted to a current value to which the threshold current has been added and is supplied to laser diode.

Exposure with laser beam is carried out by scanning laser beam in the direction perpendicular to feeding direction of photoreceptor. For this scanning, a scanner comprising combination of a rotating polygon mirror and an optical system for constant-speed linear scanning.

The exposed portions are developed in succession. In outputting of yellow image, a developing device containing yellow toner is previously set. Developing bias applied to an opposing electrode is equal to the surface potential of photoreceptor after exposed at maximum exposure as a standard value and this varies depending on charging condition and temperature and humidity of environment. Therefore, standard value of developing bias voltage is determined correspondingly to each of look-up table group which is for tone correction of photoreceptor and this is memorized in memory as table. Developing bias acutally applied may be equal to this standard value, but may be this value to which some value is added or from which some value is subtracted. Such fine adjustment is effective for adjusting highlight portion of output image. For example, when background density of original image is higher, coloration of highlight portion of output image can be prevented by increasing developing bias. In main controller, when look-up table (2) for tone correction of photoreceptor is selected, in correspondence thereto standard value of developing bias is selected from table and adjustment value for adjustment of highlight portion is added to the value or substracted from this value and the resulting value is instructed to developing bias generating circuit.

After completion of development, excess developer remaining on the surface of the photoreceptor is removed by squeeze rollers, etc. Then, for superposing magenta image, charge which remains on the surface of photoreceptor is eliminated by a charge eliminator. Elimination of charge is carried out, for example, by overall irradiation of light using a lamp. Thereafter, when the photoreceptor reaches the position of charger, grid voltage is controlled by the above-mentioned method and corona charging is carried out. Then, the same steps as in yellow image outputting are repeated. After completion of outputting of magenta image charge elimination is conducted and then the same steps are again repeated for superposition of cyan image. When output of cyan image is completed, the photoreceptor is peeled off from the metallic drum by a peeling nail and discharged out of the machine.

In the above, an example of output of color image by toners of the three colors of yellow, magenta and cyan has been explained. However, if necessary, four color image can also be obtained by adding image of black toner. In this case, image outputting step using black toner can be carried out before the first color outputting step or after the third color outputting.

According to the present invention, in formation of color image highly excellent in gradation by CPC type color electrophotographic method, accurate tone control from low density portion to high density portion can be conducted stably against variation of environmental conditions and besides correction for absorption of exposing light by the toner image formed at the previous step. Thus, this method is very advantageous for obtaining pictorial and high quality color electrophotographic image.

What is claimed is:

1. A multicolor electrophotographic method of producing an electrophotographic image by subjecting a photoreceptor to a repeated process of charging, exposing and developing, comprising:
    (a) converting an image signal read from an original image to a digital signal;
    (b) subjecting the digital signal to an electrical signal correction process wherein the electrical signal correction process includes tone correction of the photoreceptor and tone correction of toner color density and said two tone corrections are independently carried out;
    (c) converting the signal to a light which is modulated in light intensity according to the signal which is subjected to the signal processing;
    (d) exposing the charged photoreceptor to said light to form an electrostatic latent image; and
    (e) developing the latent image.

2. A method according to claim 1, wherein the digital signal in step (b) is additionally subjected to the signal correction process selected from one or more of: correction of the signal based upon variation of environmental temperature; correction of the signal based upon variation of environmental humidity; correction of the signal based on a potential of the photoreceptor just after charging; adjustment of color density of the output image; and correction of the signal based upon absorption of the light, having the exposure wavelength, by the toner image formed on the photoreceptor during a previous toner development step.

3. A method according to claim 2, wherein the signal processing includes correction of the intensity of light depending on the environmental temperature.

4. A method according to claim 2, wherein the signal processing includes correction of the intensity of light depending on the environmental humidity.

5. A method according to claim 2, wherein the signal processing includes measurement of the potential of the photoreceptor just after charging and then correction of the intensity of light based thereon.

6. A method according to claim 2, wherein the signal processing includes adjustment of the color density of the output image.

7. A method according to claim 1 which comprises superimposing toner images on the photoreceptor by repeating the charging, exposing and developing steps, wherein the signal correction process includes correction due to the exposure and absorption of the light by the toner image formed on the photoreceptor during a previous toner development step.

8. A method according to claim 1 wherein said photoreceptor comprises a photoconductive material comprising titanium dioxide.

9. A method according to claim 1, wherein said developing step uses a liquid developer.

* * * * *